United States Patent
Ortiz-Vázquez et al.

(10) Patent No.: US 12,517,973 B1
(45) Date of Patent: Jan. 6, 2026

(54) KEYWORD IDENTIFICATION FOR INCREASING WEB TRAFFIC

(71) Applicant: Quizlet, Inc., San Francisco, CA (US)

(72) Inventors: Álvaro Ortiz-Vázquez, New York, NY (US); Jeffrey R. James, Lakewood, CO (US); Austin Bay, San Francisco, CA (US)

(73) Assignee: Quizlet, Inc., San Francisco, CA (US)

( * ) Notice: Subject to any disclaimer, the term of this patent is extended or adjusted under 35 U.S.C. 154(b) by 0 days.

(21) Appl. No.: 18/405,348

(22) Filed: Jan. 5, 2024

(51) Int. Cl.
  *G06F 16/95* (2019.01)
  *G06F 16/951* (2019.01)
  *G06F 16/955* (2019.01)
  *G06F 16/958* (2019.01)

(52) U.S. Cl.
  CPC .......... *G06F 16/958* (2019.01); *G06F 16/951* (2019.01); *G06F 16/9558* (2019.01)

(58) Field of Classification Search
  CPC .................................................. G06F 16/958
  USPC ........................................................ 707/713
  See application file for complete search history.

(56) References Cited

U.S. PATENT DOCUMENTS

| | | | |
|---|---|---|---|
| 2021/0312474 A1 | 10/2021 | Yu et al. | |
| 2023/0206253 A1* | 6/2023 | Inan | G06Q 30/0269 705/7.29 |
| 2024/0256578 A1* | 8/2024 | Bhardwaj | G06F 16/2237 |

FOREIGN PATENT DOCUMENTS

| | | | | |
|---|---|---|---|---|
| EP | 4180993 A1 | * | 5/2023 | ........... G06F 16/951 |
| TW | I809962 B | * | 7/2022 | ............. G06F 16/95 |

OTHER PUBLICATIONS

Anonymous, "Keyword Difficulty Checker," https://ahrefs.com/keyword-difficulty#, Ahrefs Pte. Ltd. (201227417H) 16 Raffles Quay, #33-03 Hong Leong Building, Singapore 048581, retrieval Apr. 18, 2024, 11 pages.
Anonymous, "Visualizing BERT Vocab/Token Embeddings" http://yifanhu.net/BERT, retrieved Apr. 17, 2024, 4 pages.
Dean, Brian, "We Analyzed 4 Million Google Search Results. Here's What We Learned About Organic Click Through Rate" https://backlinko.com/google-ctr-stats, May 28, 2023, Backlinko, 34 pages.

(Continued)

*Primary Examiner* — Syling Yen
(74) *Attorney, Agent, or Firm* — Baker Botts L.L.P.

(57) ABSTRACT

The computer-implemented method includes obtaining strike distance keywords for a target website, which, when optimized for these keywords, experiences an increase in web traffic. Also, the method includes obtaining parameter sets associated with the strike distance keywords. For each strike distance keyword, a semantic embedding vector is generated, utilizing keyword-related information. Subsequently, an appended semantic embedding vector is formed by incorporating parameters from obtained parameter sets, such as keyword difficulty or search volume into the original vector. This appended semantic embedding vector is then input into a trained machine-learning model tailored to forecast traffic increases for the target website when it is optimized for the respective strike distance keyword. The model assesses traffic increase indicators for each strike distance keyword. Further, the method identifies the target strike distance keyword for the target website based on the model's evaluations of the traffic increase potential associated with each strike distance keyword.

20 Claims, 5 Drawing Sheets

(56) References Cited

OTHER PUBLICATIONS

Abu-Rmileh, Amjad, "The Multiple faces of 'Feature importance' in XGBoost," https://towardsdatascience.com/be-careful-when-interpreting-your-features-importance-in-xgboost-6e16132588e7, Feb. 8, 2019, Towards Data Science, 10 pages.

Delsole, Michael, "What is One Hot Encoding and How to Do It" https://medium.com/@michaeldelsole/what-is-one-hot-encoding-and-how-to-do-it-f0ae272f1179, Apr. 24, 2018, Medium, 9 pages.

* cited by examiner

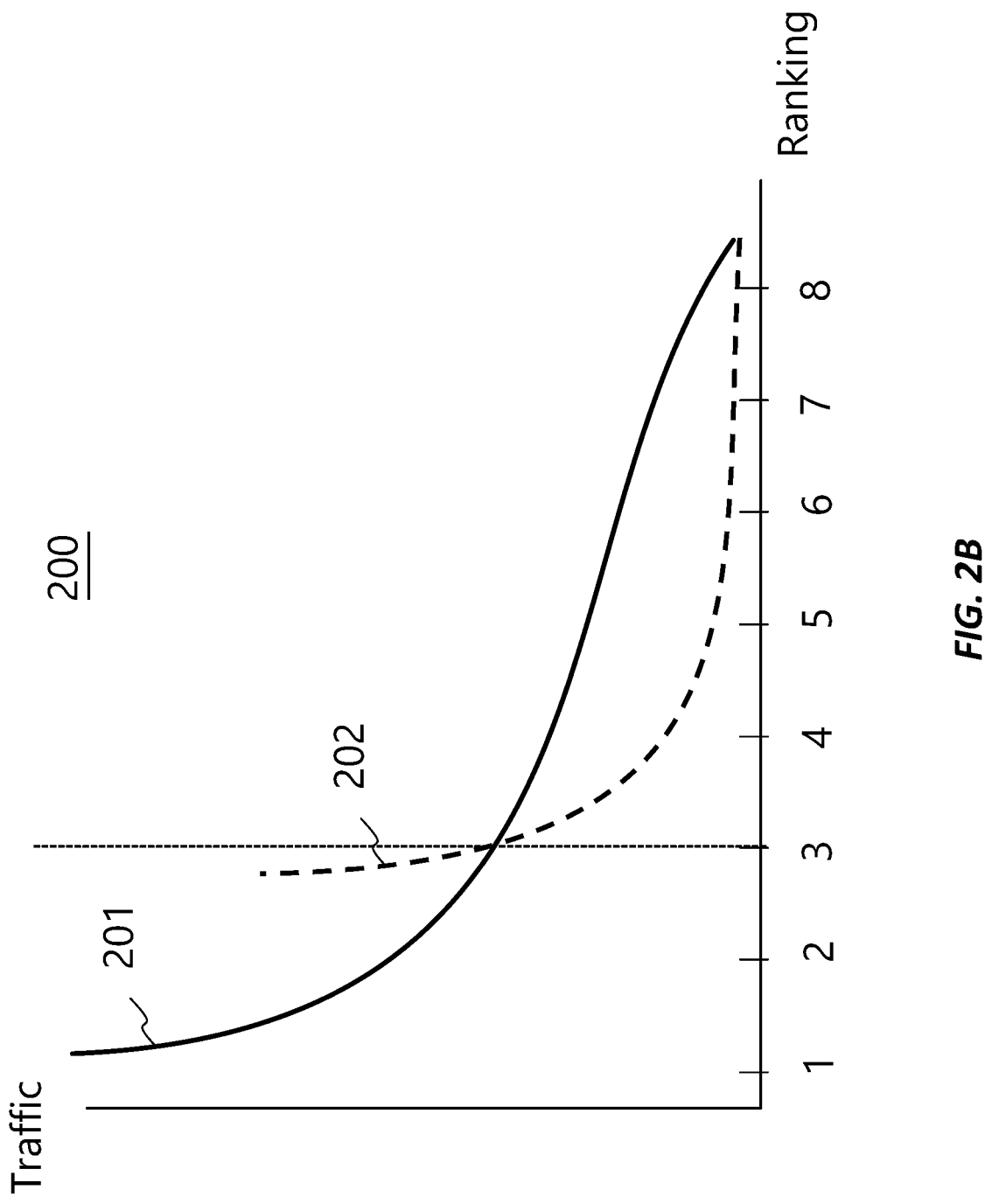

KEYWORD IDENTIFICATION FOR INCREASING WEB TRAFFIC

TECHNICAL FIELD

The disclosure relates generally to computer-implemented artificial intelligence models, and more particularly to the use of machine-learning models to improve the ranking of web pages on a website.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In the modern digital landscape, the internet serves as a vast repository of information, products, and services. With billions of websites competing for attention, search engines have become the gatekeepers to this wealth of online content. Among the myriad methods used to navigate the web, search engines stand out as the primary means through which users discover and access information.

Search Engine Optimization (SEO) is the strategic practice of optimizing websites and online content to improve their visibility and ranking in search engine results pages (SERPs). One goal of SEO is to enhance a website's position on SERPs, with the hope of capturing more organic, non-paid, and highly targeted traffic. By doing so, website owners aim to increase their online presence, attract relevant visitors, and, subsequently, achieve their business or informational objectives.

The present disclosure addresses the critical issue of search engine rankings and the remarkable disparity between ranking within the first search results, such as first 10 results and positioning in a ranking range that follows the first search results (e.g., 11-30 ranking range). This distinction is not a minor variation in search result positions; it represents a fundamental divergence in online exposure.

When a webpage secures a place within the highly sought-after top search results (e.g., top 10 search results), it gains a level of visibility that surpasses typical expectations. Extensive research demonstrates that the vast majority of internet users rarely venture beyond the first page of search results, seldom reaching results in the 20th or 30th position. Consequently, webpages within the top 10 results benefit from a very high exposure. This leads to a substantial increase in user clicks, engagement, and conversions, resulting in significantly higher website traffic and a significant competitive advantage. Indeed, the highest-ranking websites are more likely to capture the attention of potential customers or information seekers before competing websites ranked in the 20-30 range even come into view. This head start can be the determining factor in securing new customers or visitors over competitors.

Additionally, high rankings within the top 10 search results not only attract more clicks but also instill a sense of credibility and trust among users. Users tend to associate top-ranked results with authority and reliability, making them more inclined to click on and trust the content provided by these webpages. This fosters an environment conducive to building a robust brand and reputation.

Higher search engine rankings directly correlate with improved click-through rates (CTR). Users are more inclined to click on webpages appearing at the top of search results. As a result, businesses and content creators recognize the importance of striving for these coveted positions. CTR is a pivotal metric in SEO, with the top 10 rankings offering the most substantial CTR benefits.

This disclosure addresses the need to improve website rankings by describing a method and system for identifying strike distance keywords that have the potential to increase web traffic of a particular webpage.

SUMMARY

Embodiments described herein disclose a method for website optimization, particularly a method for identifying a target strike distance keyword that increases web traffic to a target website when the target website is optimized for searches related to the target strike distance keyword. In various embodiments, optimizing the target website for searches related to a specific keyword improves its ranking in search engine results when the keyword is used as a search query.

In particular non-limiting embodiments, a computer-implemented method includes obtaining, for a target website, one or more strike distance keywords and one or more sets of parameters, each set of parameters associated with each of the one or more strike distance keywords. The method further includes, for each strike distance keyword of the one or more strike distance keywords, generating a semantic embedding vector using information associated with the one or more strike distance keywords, and generating an appended semantic embedding vector by appending to the generated semantic embedding vector one or more parameters from a set of parameters associated with the strike distance keyword, the one or more parameters including a keyword difficulty or a keyword search volume. The method further includes, for each strike distance keyword of the one or more strike distance keywords, providing the appended semantic embedding vector to a trained machine-learning model, wherein the trained machine-learning model has been trained to determine, for a selected website, a traffic increase indicator associated with a selected strike distance keyword which causes a potential increase in web traffic associated with an increase in search engine ranking for the selected website when the selected strike distance keyword is used as a query for the search engine. Additionally, the method includes, for each strike distance keyword of the one or more strike distance keywords, determining, based on processing of the provided appended semantic embedding vector by the trained machine-learning model, a corresponding traffic increase indicator associated with the strike distance keyword. Further, the method includes, based on each of the corresponding traffic increase indicators, determined by the machine-learning model, identifying a target strike distance keyword for the target website.

In particular non-limiting embodiments, one or more computer-readable non-transitory storage media embodying software is provided. The software is operable when executed to obtain, for a target website, one or more strike distance keywords and one or more sets of parameters, each set of parameters associated with each of the one or more strike distance keywords. Further, the software is operable when executed to, for each strike distance keyword of the one or more strike distance keywords, generate a semantic embedding vector using information associated with the one or more strike distance keywords, and generate an appended semantic embedding vector by appending to the generated semantic embedding vector one or more parameters from a set of parameters associated with the strike distance keyword, the one or more parameters including a keyword difficulty or a keyword search volume. Further, the software is operable when executed to, for each strike distance keyword of the one or more strike distance keywords, provide the appended semantic embedding vector to a trained machine-learning model, wherein the trained machine-learning model has been trained to determine, for a selected website, a traffic increase indicator associated with a selected strike distance keyword which causes a potential increase in web traffic associated with an increase in search engine ranking for the selected website when the selected strike distance keyword is used as a query for the search engine, and determine, based on processing of the provided appended semantic embedding vector by the trained machine-learning model, a corresponding traffic increase indicator associated with the strike distance keyword. Additionally, the software is operable when executed to, based on each of the corresponding traffic increase indicators determined by the machine-learning model, identify the strike distance keyword for the target website.

In particular non-limiting embodiments, a system is provided. The system includes one or more processors; and one or more computer-readable non-transitory storage media coupled to the one or more of processors and comprising instructions operable when executed by the one or more of processors to cause the system to obtain, for a target website, one or more strike distance keywords and one or more sets of parameters, each set of parameters associated with each of the one or more strike distance keywords. Further, the instructions cause the system to, for each strike distance keyword of the one or more strike distance keywords, generate a semantic embedding vector using information associated with the one or more strike distance keywords, and generate an appended semantic embedding vector by appending to the generated semantic embedding vector one or more parameters from a set of parameters associated with the strike distance keyword, the one or more parameters including a keyword difficulty or a keyword search volume. Further, the instructions cause the system to, for each strike distance keyword of the one or more strike distance keywords, provide the appended semantic embedding vector to a trained machine-learning model, wherein the trained machine-learning model has been trained to determine, for a selected website, a traffic increase indicator associated with a selected strike distance keyword which causes a potential increase in web traffic associated with an increase in search engine ranking for the selected website when the selected strike distance keyword is used as a query for the search engine, and determine, based on processing of the provided appended semantic embedding vector by the trained machine-learning model, a corresponding traffic increase indicator associated with the strike distance keyword. Additionally, the instructions cause the system to, based on each of the corresponding traffic increase indicators determined by the machine-learning model, identify the strike distance keyword for the target website.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, and a system, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

In the drawings:

FIG. 2B are illustrative graphs relating ranking of a webpage to web traffic for that webpage, according to embodiments of the present disclosure.

DETAILED DESCRIPTION

Figure 1:
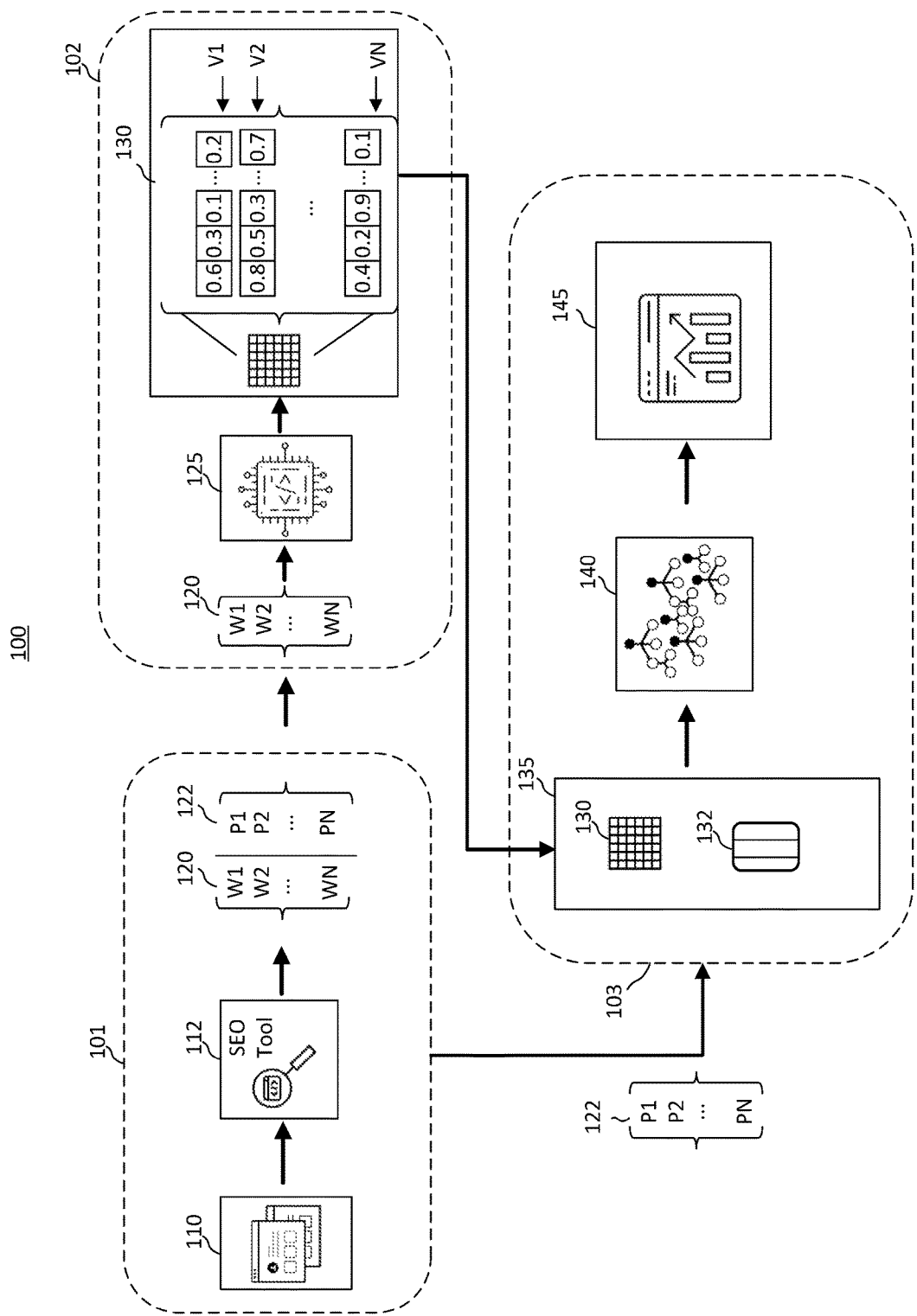
FIG. 1 is a diagram showing a method that includes steps of gathering data related to strike distance keywords, processing the collected data, and utilizing the processed data to train a machine-learning model capable of identifying strike distance keywords that can lead to a substantial increase in web traffic of a webpage, according to embodiments of the present disclosure.

In the following description, for the purposes of explanation, numerous specific details are set forth to provide a thorough understanding of the present disclosure. It will be apparent, however, that embodiments of the present disclosure may be practiced without these specific details. In other instances, well-known structures and devices are shown in block diagram form to avoid unnecessarily obscuring the description of the present disclosure.

The text of this disclosure, in combination with the drawing figures, is intended to state in prose the algorithms that are necessary to program the computer to implement various embodiments, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement embodiments of the present disclosure.

Various embodiments may be described in this disclosure to illustrate various aspects. Other embodiments may be utilized and structural, logical, software, electrical, and other changes may be made without departing from the scope of the embodiments that are specifically described. Various modifications and alterations are possible and expected. Some features may be described with reference to one or more embodiments or drawing figures, but such features are not limited to usage in the one or more embodiments or figures with reference to which they are described. Thus, the present disclosure is neither a literal description of all embodiments nor a listing of features that must be present in all embodiments.

Headings of sections and the title are provided for convenience but are not intended as limiting the disclosure in any way or as a basis for interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the present disclosure more fully. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary, and does not imply that the illustrated process is preferred. The steps may be described once per embodiment but need not occur only once. Some steps may be omitted in some embodiments or some occurrences, or some steps may be executed more than once in each embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present disclosure in which, for example, functions may be executed out of order from that shown or discussed, including substantially concurrently or in reverse order, depending on the functionality involved.

Overview of the Method

This disclosure, in its various embodiments, describes a method and system for the identification of strike distance keywords that have the potential to significantly boost web traffic of a website. Strike distance keywords are specific terms or phrases that are can be used to increase web traffic on a website. Strike distance keywords, when referenced by a website, position the website within the top few search engine results pages (SERPs), often securing rankings near top ranking positions, in response to search queries that include the strike distance keywords. When a website is optimized for a strike distance keyword, which can be accomplished, for instance, by increasing internal linking across its webpages relevant to topics related to strike distance keyword, the website may experience an increase in ranking on SERPs, and consequently, an increase in web traffic.

While achieving a top ranking often refers to securing a position within the first ten results, placing a website on the first page of SERPs, strike distance keywords may position a website on the second or third page of SERPs. For instance, a strike distance keyword could place a website anywhere from the 10th to the 30th position. This disclosure considers strike distance keywords that rank a website in a range from the top 5 to the 30th position, including rankings between the 6th to 30th, 7th to 30th, 8th to 30th, 9th to 30th, 10th to 30th, 11th to 30th, and similar variations. It should be noted that the rankings discussed herein may be provided by any appropriate SEO tool that ranks websites according to traffic.

Strike distance keywords are attractive targets for SEO efforts because with some optimization and targeted strategies, a website can potentially improve its ranking using these keywords and move into the top positions on the first page of search results. By focusing on strike distance keywords, website owners may aim to harness the existing potential for increased visibility and traffic by making relatively modest improvements to their content and SEO strategies.

Identifying and optimizing for strike distance keywords can be an effective way to achieve quicker results in improving a website's overall search engine visibility and attracting more organic traffic (e.g., the traffic which results from the visitors who come to the website through unpaid, natural, and non-advertising methods, such as finding the website through search engines, such as Google, Bing, or Yahoo, without clicking on paid advertisements or sponsored content). It's a strategic approach to SEO that leverages the existing ranking strength of a website and capitalizes on opportunities for improvement.

It should be noted that strike distance keywords may include individual words, phrases, sentences, or even paragraphs of text. In certain instances, search queries for various search engines may extend beyond conventional keyword phrases. Additional forms of data, including images, audio data, or multimedia data, can serve as search queries. For instance, images can be utilized as search queries with Google Lens.

An illustrative method described herein is designed for the identification of strike distance keywords capable of substantially increasing web traffic when a website's ranking for these keywords improves. For example, if a website was initially ranked 11th for a first keyword and is now ranked 10th for that keyword, with no significant change in traffic (e.g., changed by 5 percent), while for the second keyword, the initial ranking was 9th and the current ranking is 8th, resulting in a larger change in web traffic (e.g., increased by 10 percent), then the second keyword is determined to be the one that significantly affects traffic when website ranking for it changes. The method can be broadly categorized into three key stages: first, collecting search engine optimization (SEO) data; then, processing the acquired data to render it suitable as input for a machine-learning model; and finally, utilizing the processed data as an input to the machine-learning model to identify strike distance keywords that can result in web traffic increase when website's ranking for these keywords is increased. For a visual representation of this process, please refer to FIG. 1, which illustrates diagram 100 depicting the method for identifying strike distance keywords using a machine-learning model. The method includes step 101 of collecting SEO data, step 102 of processing the acquired data, and step 103 of using the processed data to identify the strike distance keywords.

As shown in FIG. 1, step 101 includes analyzing websites 110, for which web traffic enhancement is desired, using an appropriate SEO tool 112 to identify a set {W1, W2, . . . WN} of N strike distance keywords 120, along with their corresponding parameters {P1, P2, . . . PN} 122, which include ranking information for each keyword and traffic information for different time instances.

Website 110 may include any suitable data such as web pages, PDF files, word processing documents, spreadsheets, web forms, multimedia files which can include text, audio, video, images, animations, interactive media, 3d models, virtual reality content, or any other data (e.g., text files) that can be searchable by a search engine.

SEO tool 112 may be any suitable tool configured to provide ranking for various keywords. For example, SEO tool 112 may include tools for researching keywords and analyzing their search volume, difficulty, and potential ranking opportunities. In various cases, SEO tool 112 can be used to monitor a website's search engine rankings for specific keywords and track changes in rankings over time. Moreover, SEO tool 112 can provide a comprehensive summary of a website's backlink profile, organic search traffic, referring domains, and other relevant metrics at various time instances. SEO tool 112 may be one of the known SEO tools such as Ahrefs, SEMrush, Google Analytics, SERPstat, and the like.

Strike distance keywords 120 may include any number of keywords that position a website to rank from the top 5 to the 30th position, the top 6 to the 30th position, and the like, as described above. In various cases, strike distance keywords 120 may be keywords that, when referenced by a website and used as search queries for a search engine, position the website on the second or third page of SERPs. In various cases, strike distance keywords 120 may be reported for a particular time instance (e.g., a particular time and date in the past).

Rankings correspond to a particular website position on SERPs in response to queries containing strike distance keywords 120. For instance, consider the strike distance keyword W1—"state capitals flashcards," which may have a corresponding ranking denoted as R1=6. This ranking signifies that when this keyword is used as a query to a search engine, the website appears as the 6th result in the list of websites displayed in SERPs. In this context, ranking is also referred to as a website's position (i.e., its position in SERPs). Ranking may be determined for a current time or for any past time instance.

Parameters 122 include sets of parameters {P1, P2, . . . PN}, with each parameter set Pi containing one or more individual parameters. Parameters include, for example, keyword search volume (VOL), keyword difficulty (KD), cents-per-click (CPC), previous organic traffic (PT), previous website ranking (PR), organic traffic at a particular time t (T(t)), and website ranking at a particular time t (R(t)).

Note that both PT and T(t) describe the traffic observed for a website and is not directly related to any of keywords {W1, W2, . . . WN}. To illustrate, P1 may include several parameters. In one implementation, the parameter set Pi is a vector which includes VOL, KD, CPC, PT, PR, T, and R, which can be written for P1 as P1={VOL1, KD1, CPC1, PT1, PR1, T1, R1}.

Herein, keyword search volume (VOL) refers to the search volume or search traffic volume associated with a specific keyword. Keyword search volume is a metric that indicates how many times a particular keyword or search query is entered by users into a search engine within a specific timeframe, e.g., on a monthly basis, on a daily basis, on an hourly basis, etc. It represents the popularity and demand for that keyword. Keywords with higher search volumes generally indicate greater user interest and a larger potential audience. However, they may also have higher competition, making it more challenging to rank for them in search engine results.

Keyword difficulty (KD) is a metric or score that assesses how challenging it is to rank for a specific keyword on SERPs. The score helps SEO professionals and website owners understand the level of competition associated with a particular keyword. Keyword difficulty can be evaluated based on a number of websites and web pages that already rank for that keyword, and/or based on quantity and quality of backlinks pointing to the top-ranking pages for the keyword.

Cost-per-Click (CPC) is a metric commonly associated with pay-per-click (PPC) advertising and online advertising campaigns, rather than organic search engine optimization. It represents the amount an advertiser pays each time a user clicks on their online advertisement. Advertisers bid on specific keywords, and the CPC for a keyword depends on various factors, including competition, keyword relevance, and quality score. SEO professionals may use CPC data to understand the monetary value and competitiveness of specific keywords in paid advertising campaigns. While CPC is primarily used in the context of paid advertising, SEO professionals can also consider CPC data when conducting keyword research. Keywords with higher CPC values often indicate that advertisers are willing to invest more money to target those keywords. This may imply that these keywords are valuable and competitive. SEOs can use this insight to prioritize their organic SEO efforts and content creation, focusing on high-value keywords. Further, CPC data can help SEO practitioners gauge the competition level for specific keywords. High CPC values suggest intense competition, which may also apply to organic search results. Identifying competitive keywords can help SEO professionals plan their strategies more effectively.

Previous organic traffic PT refers to the traffic for a website acquired at a specific past date and time, along with the previous website ranking PR, denoting the prior ranking of a website at that same date and time. Previous organic traffic PT and previous website ranking PR serve as historical data for training a machine-learning model to forecast the impact of a website's position change on web traffic. Previous organic traffic PT and previous website ranking PR are determined for a time instance prior to the time instance for which ranking R and web traffic T is determined. Similar to previous organic traffic PT, organic traffic T refers to the traffic for the website acquired at a specific date and time, along with the website ranking R, denoting the ranking of a website at that same date.

In various scenarios, web traffic signifies the number of visitors who interact with a website. Organic traffic T denotes the count of visitors who reach a website through unpaid, natural search results on major search engines like Google, Bing, or Yahoo. Herein, web traffic and organic traffic are used interchangeably. Organic traffic T is commonly assessed by counting the number of users who access a website during a specified period of time, which can range from minutes, hours, days, weeks, to months, among other intervals, depending on the reporting requirements and analysis goals. Organic traffic T is often assessed at a specific point in time. For example, it could signify the number of visitors to a website in the preceding hour or within a one-hour timeframe from a week ago.

In addition to the parameters {VOL, KD, CPC, PT, PR, T, R}, the SEO tool 112 can produce various other parameters, which can be leveraged to enhance the training of a machine-learning model. For example, Google Trends data may be employed, as well as any other relevant parameters that could impact the identification of strike distance keywords.

As illustrated in FIG. 1, the processing of strike distance keywords 120 occurs at step 102 of a method depicted in diagram 100. In various embodiments, these strike distance keywords 120 are processed via a semantic embedding model 125. Semantic embedding model 125 takes the keyword text of each keyword {W1, W2, ... WN} as input and produces corresponding semantic embedding vectors {V1, V2, ... VN}, which are represented as numerical values within the matrix of numbers forming semantic embedding data 130, as depicted in FIG. 1. In various implementations, the length of each vector, such as V1 through VN, may be uniform and may consist of tens or hundreds of entries. For instance, the length of a semantic embedding vector might comprise a few hundred entries, including options like 128 entries, 256 entries, 512 entries, 1024 entries, and similar dimensions. In certain cases, it may include 768 entries.

In one embodiment, semantic embedding model 125 may be a sentence transformer configured to convert a word, a phrase, or a sentence into dense vector representations in a way that captures semantic meaning. The sentence transformer is designed to enhance natural language understanding and are known to be used in various natural language processing (NLP) tasks, including text classification, semantic similarity measurement, and information retrieval. Sentence transformers take sentences or phrases as input and transform them into high-dimensional vectors where similar sentences are represented as vectors that are close in the vector space, allowing for efficient similarity comparisons. Popular pre-trained sentence transformers include models like BERT (Bidirectional Encoder Representations from Transformers), RoBERTa, and many others, which can be fine-tuned for specific NLP tasks.

In various embodiments, following the processing of strike keywords at step 102, semantic embedding data 130, along with data 132 derived from parameters 122, are combined to create an input data record 135. Such input data record 135 serves as an input for a machine-learning model 140.

Machine-learning model 140 can be any suitable model for identifying a strike distance keyword that can lead to a significant traffic increase when the website ranking for such keyword is increased. For instance, machine-learning model 140 may include one or more machine-learning algorithms for classification and regression. In one implementation machine-learning model 140 may include one or more decision trees. For example, the machine-learning model 140 may include random forest model.

In various implementations, the prediction of which strike distance keyword results in a substantial traffic increase may be output by the machine-learning model 140 as an output data 145. The output data 145 may be presented in a variety of different ways. In a specific implementation, output data 145 can be presented as a distinct (target) strike distance keyword that maximizes traffic increase when the website is optimized for that specific keyword. For instance, consider the case where the web traffic for a first strike distance keyword, "Nike Sneakers," doubles (e.g., a surge from 100 to 200 visitors within a specific time frame, such as an hour) as a result of optimizing the website for "Nike Sneakers", leading to a change in ranking from position 10 to position 9 for that website. In comparison, the web traffic for a second strike distance keyword, "Adidas Yeezy," only increases by 2 visitors during a similar ranking shift. In this scenario, the first strike distance keyword might be identified as the target keyword for website optimization.

It's important to note that the provided example is illustrative, and various approaches can be considered for determining which strike distance keyword results in a substantial benefit from a traffic increase. For example, if "Crocs" lead to a 100 percent traffic increase (e.g., rising from 30 visitors to 60 visitors per hour), while "Nike Sneakers" result in a 200 percent traffic increase (e.g., climbing from 5 visitors to 15 visitors per hour), "Crocs" could be chosen as the target strike distance keyword due to a larger net web traffic increase. Alternatively, considering the price of Nike sneakers at $300 and crocs at about $10, an increase of 10 potential customers for Nike sneakers could yield revenue growth of up to $3000. Meanwhile, an increase of 30 potential customers for Crocs could result in revenue growth of up to $300, leading to the selection of "Nike Sneakers" as the target strike distance keyword.

In some other implementations, several strike distance keywords may be presented, and an associated metric of web traffic increase may be presented to indicate how improvement of a website ranking for a particular strike distance keyword may result in an associated web traffic increase. For example, the output data 145 may be presented as a particular strike distance keyword that maximizes web traffic increase per unit increase in ranking. Output data 145 may further present results for one or more strike distance keywords that have been processed in accordance with steps 101 to 103. For example, the one or more strike distance keywords can be displayed in in any desired order via output data 145, including in order from smallest to largest web traffic increase per unit increase in ranking, or largest to smallest web traffic increase per unit increase in ranking.

In various instances, machine-learning model 140 can be trained through the analysis of diverse input data records 135, each providing insights into how changes in website ranking for a particular website and a specific keyword influence the web traffic for that website.

In various scenarios, the training of machine-learning model 140 follows a methodology similar to that of training (or otherwise known as building) random forests. To illustrate, the process begins by determining hyperparameters for a random forest, which may include specifying the number of trees within the forest and the maximum depth of each tree. Subsequently, multiple decision trees are created. Each tree is constructed using a different subset of data derived from the multiple input data records 135. Moreover, each tree is designed to consider only a random subset of features at each split. Additionally, during the construction of a decision tree, a technique known as "feature bagging" may be employed. Feature bagging includes the selection of a random subset of features to be considered at each split. This strategy reduces the correlation between trees, and ultimately may enhance the overall predictive accuracy of the random forest.

Figure 2A:
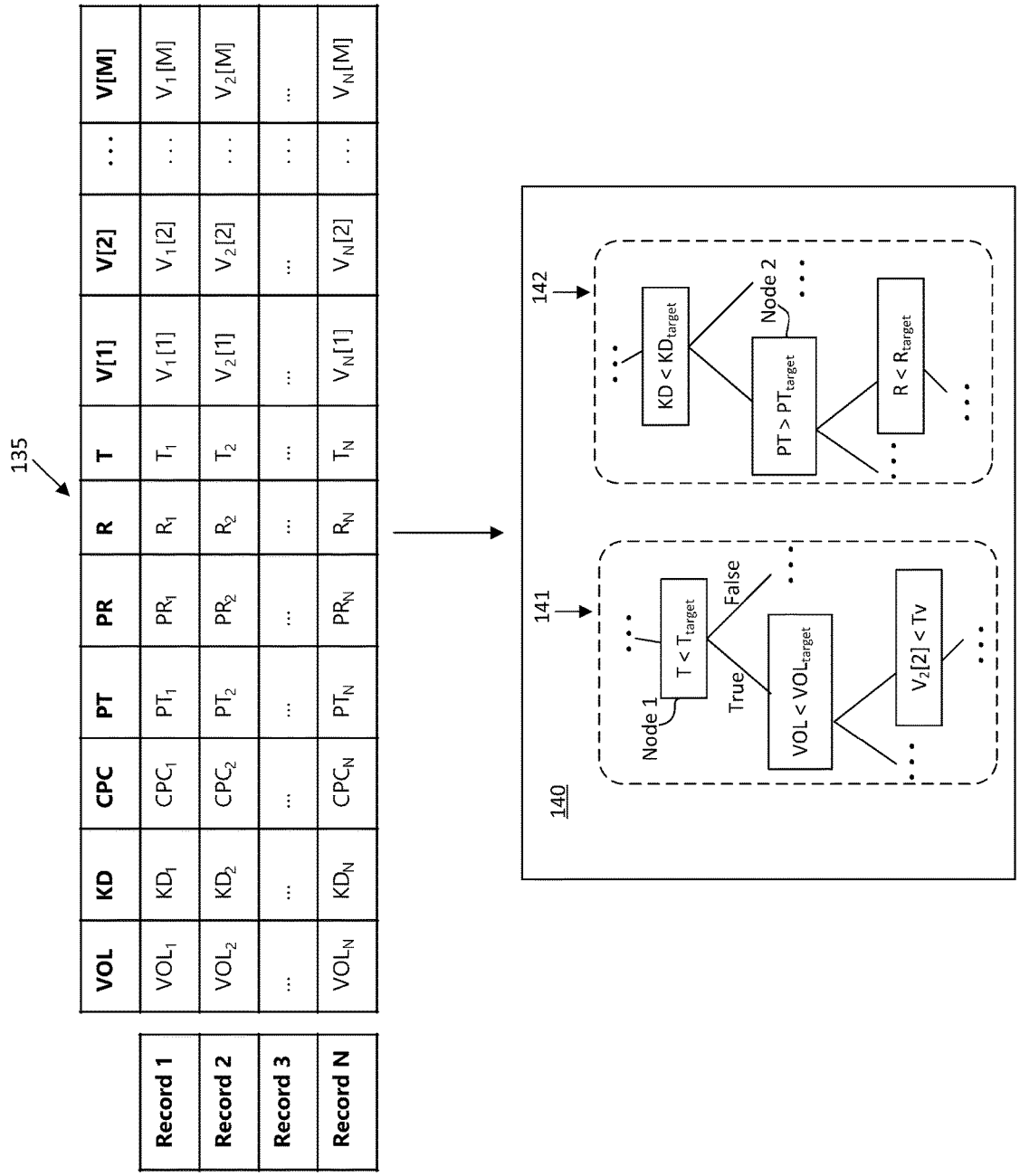
FIG. 2A is an illustrative data structure employed for the training of a machine-learning model according to embodiments of the present disclosure.

FIG. 2A shows an example data arrangement of input data records 135 in the form of a table with rows (Records 1-N) and corresponding columns {VOL, KD, CPC, PT, PR, R, T, V[1], V[2], . . . V[M]}. Here, V[2], for example, is the second component of vector V (vector V includes components V[1] to V[M]) that results from the semantic embedding of a strike distance keyword. As an illustration, Record 2 could include a vector $V_2$ (formed by $V_2[1]$ to $V_2[M]$) serving as a semantic embedding vector for the strike distance keyword W2, accompanied by associated parameters {$VOL_2$, $KD_2$, $CPC_2$, $PT_2$, $PR_2$, $R_2$, $T_2$}.

Input data records 135 are used to train machine-learning model 140, which, as depicted in FIG. 2A, may include multiple decision trees, such as trees 141 and 142. Each of these trees includes essential elements known in the field, such as nodes (e.g., nodes 1 and 2 shown in FIG. 2A), branches, and leaves.

Nodes serve as pivotal points where the tree makes decisions by partitioning the data into smaller subsets based on specific criteria. For instance, consider node 1, which involves a decision based on the magnitude of traffic T. If the traffic T is less than a predefined target traffic value (e.g., $T_{trget}$, which could represent 11 users visiting a website within a specified time interval, such as one hour), a left branch (True) is taken. Conversely, if the traffic T is greater than or equal to the $T_{target}$ value, a right branch may be chosen. Similar decision criteria can be applied for split decisions, including evaluating previous traffic (PT) in relation to the target previous traffic ($PT_{target}$), assessing ranking (R) in comparison to the target ranking ($R_{target}$), considering keyword difficulty (KD) relative to a target KD value ($KD_{target}$), examining volume (VOL) as it relates to a target volume ($VOL_{target}$), or comparing specific components of vector V2 against predefined target values (e.g., comparing a second component of V2 to a target value Tv).

It is important to note, as depicted in FIG. 2A, that only a partial representation of decision trees 141 and 142 is presented, as indicated by the ellipsis. Numerous additional nodes, branches, and leaves may exist within the tree structure but are not displayed in this illustration.

In various instances, the process of determining the appropriate conditions for constructing nodes within a tree, as well as their placement (such as whether a node serves as a root node or a second-level node, denoting it as a child of a root node), constitutes a training process. This process may involve selecting a split condition that maximize information gain for accurate classification at the node, often achieved through means aimed at minimizing measures of impurity, including Gini impurity, entropy, and other recognized techniques in the field, as per established practices. In some cases, when training trees of a random forest, at each node of a decision tree in the random forest, a random subset of features is considered for the split, which further adds randomness and reduces correlation between the trees of the random forest.

When determining a strike distance keyword using a random forest, voting among different decision trees may be performed. For instance, a random forest may combine the predictions from each individual tree by taking a majority vote for identifying a strike distance keyword. This ensemble approach improves the overall predictive power and generalization of the model.

In various scenarios, some of the data derived from input data records 135 may serve verification purposes. For instance, when the anticipated outcome is a maximum increase in web traffic resulting from a specific strike distance keyword, the machine-learning model 140 can analyze one or more input data records 135 and generate predictions for strike distance keywords that optimize web traffic when the website's ranking for those keywords is improved.

It is important to acknowledge that different input data records 135 may include parameters determined at various time instances. For instance, a first input data record may include the first previous traffic $PT_{time1}$ and first previous ranking $PR_{time1}$ computed for a specific first time instance, such as two weeks ago, while another input data record may include the second previous traffic $PT_{time2}$ and second previous ranking $PR_{time2}$, computed for another second time instance, such as one month ago.

It is important to emphasize that while the methods discussed herein involve the identification of specific strike distance keywords that can enhance web traffic when the website's ranking for those individual keywords is improved, alternative approaches may involve identifying combinations of strike distance keywords that collectively boost web traffic when the website's ranking for all these keywords is enhanced.

In certain scenarios, if the increase in web traffic per unit rank increase (TpR) for a first strike distance keyword W1 is denoted as TpR1, and the increase in TpR for a second strike distance keyword W2 is TpR2 (where TpR2<TpR1), and the increase in TpR for a third strike distance keyword W3 is TpR3 (where TpR3<TpR2), then, in some instances, the ranking increase for W1 and W3 may result in a combined TpR13 that surpasses TpR12. In another example, the ranking increase for W1 and W2 may result in a combined TpR12 that surpasses TpR13. In another example, the ranking increase for W2 and W3 may result in a combined TpR23 that surpasses TpR12 and/or TpR13. This aggregated effect on web traffic increase due to combined actions can also be determined by a suitable machine-learning model, akin to the machine-learning model 140.

In various scenarios, web traffic may exhibit exponential dependence on website ranking, as illustrated in plot 200 depicted in FIG. 2B. In an exemplary embodiment, graph 201 illustrates the relationship between web traffic and ranking for a first strike distance keyword, while graph 202 represents the same relationship for a second strike distance keyword. It is important to note that the web traffic per unit increase in ranking (e.g., the slopes of graphs 201 and 202) vary across different ranking positions. For instance, within the range of ranking positions from 3 to 8, the slope of graph 201 surpasses that of graph 202. Consequently, this results in higher web traffic for a unit increase in ranking for the first strike distance keyword when its ranking position falls within the 3-8 range. Conversely, the slope for graph 202 is more pronounced for rankings within the 1-3 range, signifying that web traffic experiences a more significant increase when the website ranking for the second strike distance keyword is raised from position 3 to position 2, compared to the corresponding change for the first strike distance keyword.

In the context of the aforementioned description and with reference to FIG. 2B, a machine-learning model (such as machine-learning model 140) can determine the specific strike distance keyword (whether it's the first or the second strike distance keyword) based on the desired change in website ranking, specifically from which ranking position to another ranking position this change is required. Furthermore, in certain instances, and as an additional or alternative consideration, the machine-learning model 140 may not only assess the extent of the web traffic increase but also the probability of such an increase occurring when the ranking of a website for a specific strike distance keyword is increased.

Figure 3:
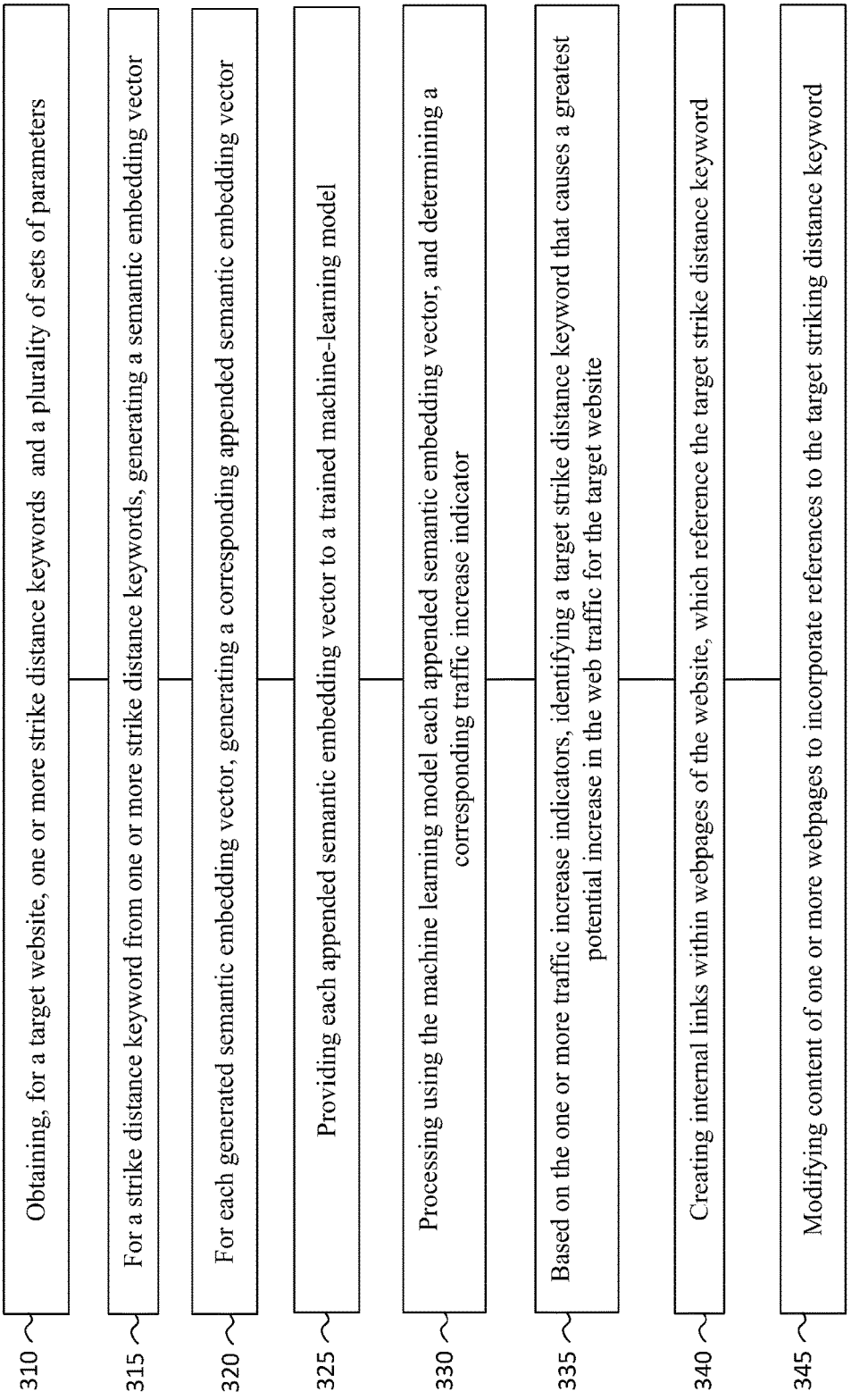
FIG. 3 is an illustrative method for determining an impact of an improved website ranking for a strike distance keyword on a traffic increase indicator, according to embodiments of the present disclosure.

FIG. 3 describes an embodiment of a computer-implemented method 300 for identifying a strike distance keyword that can lead to a significant increase in a web traffic due to increase in website ranking for that particular strike distance keyword. Method 300 includes step 310 of obtaining, for a target website, one or more strike distance keywords (e.g., strikes-distance keywords 120, as shown in FIG. 1) and a plurality of steps of parameters. As described above, in relation to FIG. 1, the strike distance keywords may be obtained using a suitable SEO tool, as shown in step 101 of a method shown in diagram 100 of FIG. 1. The strike distance keywords are selected such that when these strike distance keywords are used as a query for a search engine the target website appears in top few SERPs (e.g., in first two or three pages of SERPs) In various embodiments, the search keywords that place the target website in top five ranking position may not be considered as strike distance keywords due to already very high ranking for those search keywords. Generally, the strike distance keywords may place the website in first 5 to 30, ranking positions, 6 to 30 ranking position, and the like, as described above. In some cases, the strike distance keywords are selected such that when they are used as search engine queries, they place the website on a second or third search engine result page. Further, at step 310, a plurality of sets of parameters is also obtained using the SEO tool. Each set of parameters in the plurality of sets of parameters correspond to each one of the one or more strike distance keywords. A set of parameters can have one or more parameters. For example, a set of parameters may have any suitable number of parameters, such as 1, 2, 3, 4, 5, 6, 7, 8, 9, or 10 parameters. In some cases, the set of parameters may include a vector of data (e.g., a vector of numerical data). In some cases, parameters may include alphanumerical data.

Method 300 further includes, at step 315, for a strike distance keyword from one or more obtained strike distance keywords, generating one or more semantic embedding vectors associated with each one of the one or more strike distance keywords. For example, each of the one or more semantic embedding vectors may be generated using information from an associated strike distance keyword as well as other strike distance keywords when such keywords are obtained. An example semantic embedding vector associated with one of strike distance keywords may correspond to a semantic embedding vector VN as shown in FIG. 1. Step 315 may correspond to step 102 of a method shown in diagram 100 of FIG. 1.

Further, at step 320, method 300 includes for each generated semantic embedding vector generating a corresponding appended semantic embedding vector by appending to the generated semantic embedding vector the one or more parameters from a set of the plurality of sets of parameters, the set of parameters associated with each strike distance keyword. The one or more parameters may include a keyword difficulty (KD), and a keyword search volume (VOL). Additionally, any other parameters such as CPC, PT, PR, R, T, as described above may be added. Such usage of parameters is indicated in FIG. 1 and FIG. 2A. In particular, in FIG. 2A, the semantic embedding vector $V_1$-$V_N$ is appended with corresponding parameters $KD_1$-$KD_N$, $VOL_1$-$VOL_N$, $CPC_1$-$CPC_N$, $PT_1$-$PT_N$, $PR_1$-$PR_N$, $R_1$-$R_N$, and $T_1$-$T_N$ to result in corresponding records Record 1-Record N. In some cases, the parameters further may include a ranking of the website at a first time instance, a ranking of the website at a second time instance, traffic to the website at the first time instance, and/or traffic to the website at the second time instance. In some cases, the second time instance is a present time instance.

Further, at step 325, method 300 includes, providing each appended semantic embedding vector to a trained machine-learning model for determining an impact of an improved website ranking on a traffic increase indicator. In various embodiments, the trained machine-learning model is trained to determine, for a selected website, a traffic increase indicator associated with a selected strike distance keyword which causes a potential increase in web traffic associated with an increase in ranking for the selected website when the selected strike distance keyword is used as a query for a search engine.

The traffic indicator may denote the quantity of web traffic increase or the likelihood values of such an increase. The impact of an improved website ranking on a traffic increase indicator can be quantified through any suitable numerical metric. For example, it can be measured as the increment in web traffic per unit change in ranking, the extent of web traffic increase when the ranking transitions from a first position to a second position, or the probability of web traffic increase when the ranking makes a similar transition. In some cases, the traffic increase indicator may provide a comparison how different strike distance keywords may affect a web traffic. For example, a traffic increase indicator may be used to indicate that a first strike distance keyword increases web traffic to the target website more than a second strike distance keyword when ranking for the target website for such strike distance keywords increases by the same quantity.

Further, at step 330 method 300 includes, processing using the trained machine-learning model each appended semantic embedding vector, and determining a corresponding traffic increase indicator. The traffic increase indicators may be generated for each one of the generated appended semantic embedding vectors leading to a generation of one or more traffic increase indicators each one corresponding to each of the one or more strike distance keywords.

Further, at step 335, based on the one or more traffic increase indicators, method 300 includes identifying a target strike distance keyword that causes the greatest potential increase in the web traffic for the target website. For example, when for several strike distance keywords the traffic increase indicators are determined, then these traffic increase indicators may be automatically compared using programming instructions of a suitable software application to determine which one of the traffic increase indicators is the largest. When such largest traffic increase indicator is identified, a corresponding strike distance keyword is selected as the target strike distance keyword.

In various embodiments, method 300 may include one or more additional optional steps 340 and 345, as shown in FIG. 3. For example, at step 340, method 300 may further include creating internal links within webpages of the website, which reference the target strike distance keyword. For example, internal links to a context in a webpage of the website containing the strike distance keyword may be created. These internal links may connect to contextually relevant content within the same website. For instance, if the identified strike distance keyword is "diet," and the website hosts a blog post titled "Tips for a Healthy Diet," internal links can be added to guide users to related articles such as "The Benefits of a Plant-Based Diet," "How to Create a Balanced Diet," or "Eating Well and Exercising." By establishing these meaningful connections between content pieces, the website can strengthen its relevance on the subject, ultimately contributing to improved search engine rankings for the strike distance keyword "diet."

Further, a strike distance keyword within a context of a webpage of the website can be used as an anchor text (e.g., a clickable text within a hyperlink that directs users to another page on the same website or to an external source). The strike distance keyword, when used as anchor text within the context of a webpage on a website, may enhance the webpage's ranking for that specific keyword. When a strike distance keyword is used as anchor text, search engines may recognize the content and topic of the linked page. This alignment between the keyword in the anchor text and the content of the linked page may help search engines understand the page's relevance to that keyword. Further, anchor text may be given more weight in search engine algorithms. By using a strike distance keyword as anchor text, the importance of that keyword within the content of the linked page may be emphasized. Additionally, or alternatively, a link from one webpage of the website may be created to a portion of a blog page that discusses topics associated with the strike distance keyword.

In addition to step 340, or alternative to step 340, in some embodiments method 300 may include an optional step 345 of modifying content of one or more webpages to incorporate references to the identified strike distance keyword when step 330 is applicable. For example, some words synonymous to the strike distance keyword may be substituted with the strike distance keyword, or content may be expanded to include discussion on a subject related to the strike distance keyword.

It should be noted that method 300 described herein is only one illustrative approach for using strike distance keywords for increasing web traffic. Different variations of method 300 can be readily conceived and put into practice to achieve the same goal of increasing web traffic. For instance, a method similar to method 300 may include steps 310-325 of method 300, and also include steps of identifying a first strike distance keyword from the plurality of strike distance keywords where the first strike distance keyword has the greatest increase of a web traffic when a website ranking for that first strike distance keyword is increased. Further, the method may include identifying a second strike distance keyword from the plurality of strike distance keywords. The second strike distance keyword may have a second greatest increase of the web traffic when a website ranking for that second strike distance keyword is increased. Moreover, in some implementations, the method may include creating internal links within webpages of the web site, based on the first and second identified strike distance keyword or modifying content of one or more webpages to incorporate references to the identified first and second strike distance keywords.

In various embodiments, some or all of the steps of method 300 can be automated. For instance, the identification of a target strike distance keyword may be automated through a dedicated software application with instructions executed on a suitable computing device, as elaborated further in FIG. 4. This software application might include instructions for sending a query to a search engine optimization tool, such as SEO tool 112, to retrieve strike distance keywords (W1-WN) and corresponding parameters (P1-PN), as depicted in FIG. 1. Once obtained from the SEO tool 112, the software application may further include instructions for processing the strike distance keywords, involving actions like generating appended semantic embedding vectors, as outlined in steps 315 and 320 of method 300, illustrated in FIG. 3.

Moreover, the software application could be designed to carry out instructions for determining one or more traffic increase indicators for a target website utilizing a machine-learning model, as described in steps 325 and 330. Additionally, it may include instructions for identifying the target strike distance keyword, as outlined in step 335 of method 300. The software application can be configured to automatically compare traffic increase indicators for different strike distance keywords and select the one with the highest value. For instance, when a first strike distance keyword is has a corresponding first traffic increase indicator and a second strike distance keyword has a corresponding second traffic increase indicator, the two indicators can be compared to determine the largest one. For example, if the first traffic increase indicator is the largest, the first strike distance keyword can be selected as the target strike distance keyword.

In certain instances, the software application might be configured to autonomously identify multiple target strike distance keywords. The software application could be programmed to automatically identify strike distance keywords corresponding to a specified number of top traffic increase indicators. For instance, if the specified number is three, the three strike distance keywords corresponding to the top three traffic increase indicators could be selected as target strike distance keywords. This approach is applicable for various values of the specified number, such as 2, 3, 4, 5, 6, 7, 8, and so on.

In certain scenarios, the software application might evaluate increments in web traffic for the target website against a predetermined threshold. If a strike distance keyword causes the web traffic to exceed this predetermined threshold when the target website is optimized for that specific keyword, it could be classified as part of a set of target strike distance keywords.

In various cases, the threshold for web traffic increase may be established based on relevant business considerations. This could involve evaluating diminishing marginal returns associated with the cost of updating the target website, such as identifying content for creating internal links within the site, in relation to the benefits of such updates for the set of target strike distance keywords. The determination of the predetermined threshold may be dynamic and subject to change based on several factors, such as shifts in people's preferences, fluctuations in website traffic, alterations in website content, and more. For instance, a higher demand for a specific product provided by the website could prompt an adjustment to the web traffic threshold used to determine which strike distance keywords should be included in the set of target strike distance keywords.

In certain instances, a Boolean combination of strike distance keywords (such as a combination using the AND operation) can be employed to assess how such a combination might impact web traffic. In some cases, the machine learning model can be configured to consider not only single appended semantic embedded vectors but also combinations of these vectors to determine a traffic increase indicator for such a combination. Multiple combinations can be prepared and evaluated against each other using their corresponding traffic increase indicators to identify the combination that generates the largest traffic increase.

In some instances, strike distance keywords may be selected based on their ability to increase web traffic for specific user groups or visitors arriving from particular traffic sources, rather than solely focusing on overall web traffic for all visitors. This approach allows for a more targeted and nuanced optimization strategy that caters to the diverse needs and behaviors of different user segments. For instance, when selecting target strike distance keywords, higher priority may be given to web traffic originating from specific websites or social networks rather than traffic from other sources. For example, a website selling MAGA hats might prioritize web traffic from "Truth Social" over traffic from other social media platforms, and a website selling fur coats might prioritize web traffic from users accessing the website from IP addresses in Alaska.

It should be noted that in some embodiments, in addition to, or alternative to determining which strike distance keywords increases overall web traffic to the website other criteria can be used for optimizing the website performance. For example, such criteria may include determining strike distance keywords that increase overall conversion rate which correspond to a percentage of visitors who take a desired action, such as completing a purchase, subscribing to a newsletter, or downloading a file. Similar to the embodiments discussed above, a suitable machine learning model may be trained to determine a strike distance keyword that leads to increased overall conversion rate. Such training may utilize historical conversion data for that website.

In some cases other parameters such as time on site (e.g., how much time a visitor spends at a website) page views (how many pages a visitor view at the website), bounce rate (a percentage of viewers that leave the website after viewing the first page), exit pages (the webpages that are last viewed by users before exiting the website), and the like can also be considered when determining target strike distance keywords that can be used to optimize performance of the website.

In some cases, the target strike distance keyword (or several target strike distance keywords) may be presented to a user of the software application via any suitable means (e.g., via a display), or transmitted to any suitable program, user, and the like. In some cases, once one or more target strike distance keywords are identified, the software application may be configured to automatically perform any of steps 340 or 345 of method 300. For example, the software application may be configured to automatically perform step 340 by identifying (a) all target webpages of the target website that include the target strike distance keyword, (b) all source webpages of the website that discuss topics presented in the target webpages, and (c) all the text within the source webpages that can be used as an anchor text for linking the source webpages to the target webpages. Subsequently the software application may further be configured to link the source webpages to the target webpages using the identified anchor text. Further, in some cases step 345 of method 300 may be automated by, for example, (a) identifying keywords which are similar to the target strike distance keyword, and (b) replacing the similar keywords with strike distance keywords. For instance, if the strike distance keyword is a "hound" a similar keyword may be a "dog." The similar keywords may be determined using any suitable means (e.g., by transforming at least some words within webpages of the website into embedding vectors and computing a difference vector between such embedding vectors and the embedding vector corresponding to the target strike distance keyword, or by using suitable synonym dictionaries).

The described software application can be used for automated website management to boost traffic. It could be run regularly (hourly, daily, weekly, monthly, etc.) to handle website tasks automatically, offering a significant improvement over current methods for dealing with technical issues in maintaining and increasing web traffic.

The software application might be configurable. For example, the user could adjust parameters like the threshold for determining which keywords are used for website optimization or how many keywords need optimization. Other configurable parameters could include the set of webpages allowed for optimization, the extent of optimization (e.g., whether both steps 340 and 345 are performed or only one), and more.

In various embodiments, when training a machine-learning model (e.g., machine-learning model 140), importance gain may be analyzed. The importance gain refers to a measure of the contribution of each feature (or variable) to the accuracy of the machine-learning model's predictions. It helps determine which features are the most influential in making predictions and is particularly useful for feature selection and understanding the model's behavior.

The importance gain can be calculated based on a decrease in impurity (commonly measured by Gini impurity or entropy) caused by each feature when it is used to split the data in the decision trees of the random forest. Features that result in the largest reduction in impurity when used for splitting are considered more important, as they have a stronger impact on the model's performance.

Higher importance gain values for a feature indicate that the feature is more critical for making accurate predictions, while lower values suggest that the feature has less impact on the model's overall performance. These importance scores are useful for identifying key features in the dataset such as input data records 135, understanding the factors that drive the model's decisions, and potentially improving the model by focusing on the most influential features.

In certain instances, while training machine-learning model 140, an analysis of the components within the semantic embedding vectors can be carried out to identify components that exhibit a notably high importance gain. These specific components are then used to determine which strike distance keywords have a substantial impact on web traffic when their webpage ranking is improved. For instance, if a particular component of a strike distance keyword, known for its observed high importance gain, has a value exceeding a predetermined threshold, such as 0.4, 0.5, 0.6, 0.7, 0.8, 0.9, or similar values, this strike distance keyword may be regarded as a potential candidate for significantly influencing web traffic.

In various embodiments, when strike distance keywords are identified, these keywords may be uses for tracking how different SEO website enhancements affect rankings for such strike distance keywords. For instance, when implementing various SEO techniques, such as linking between webpages of the website, or improving the website based on SEO recommendations from recommendation modules, these strike distance keywords can be instrumental in quantifying the effectiveness of the SEO website enhancements in elevating the ranking of our website.

Further, the impact of internal linking can be determined by monitoring website ranking changes after implementing broad internal linking compared to targeted linking of strike distance keyword content. This comparison can reveal which approach is more effective in driving the traffic to the website.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
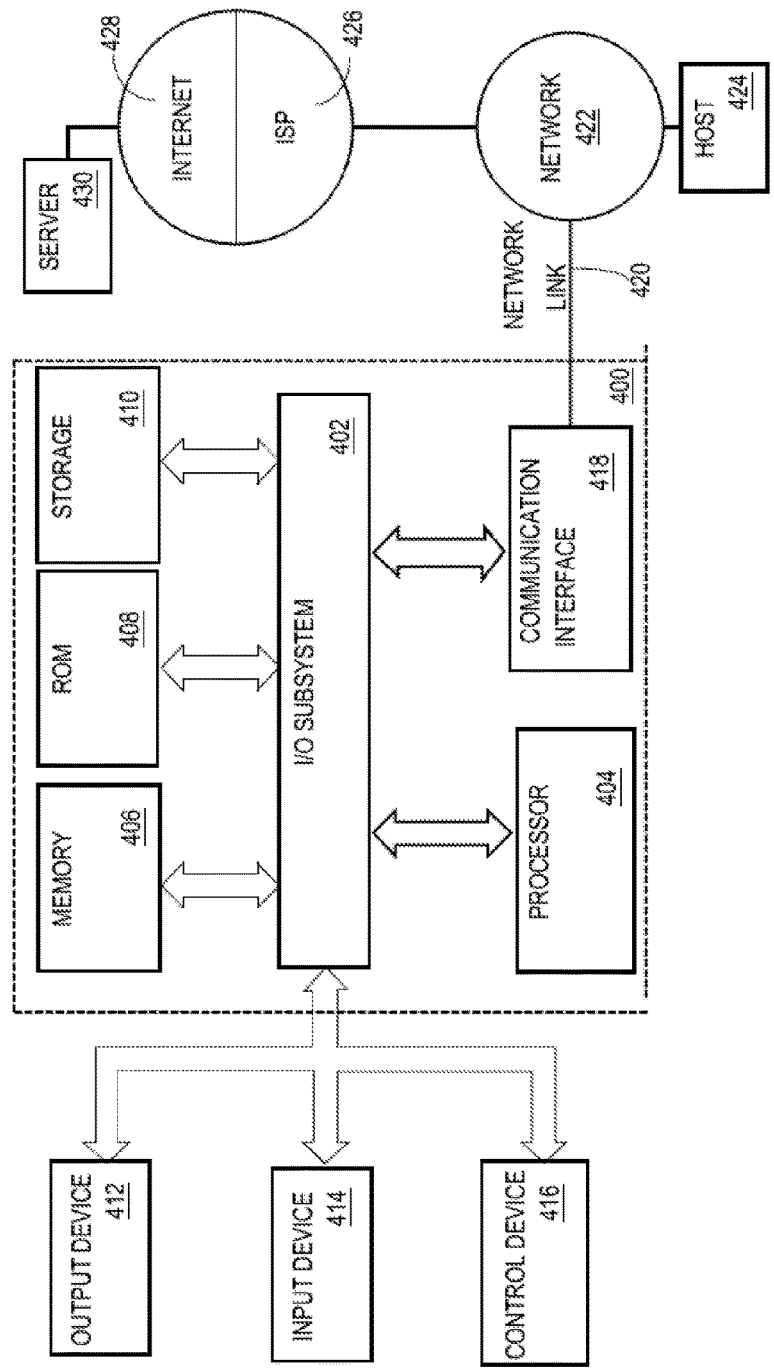
FIG. 4 is an illustrative computer system suitable for implementing the methods described herein, according to embodiments of the present disclosure.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk, or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators, or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device 412. Control device 416 may have at least two degrees of freedom in two axes, a first axis (e.g., x) and a second axis (e.g., y), that allows the device to specify positions in a plane. Another type of input device may be a wired, wireless, or optical control device such as a joystick, wand, console, steering wheel, pedal, gearshift mechanism or other type of control device. Input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to I/O subsystem 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through network 422 to host 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server 430 may be coupled to internet 428. Server 430 broadly represents any computer, data center, virtual machine, or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the present disclosure have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the present disclosure, is the literal and equivalent scope of the set of claims that issue from this application, in the specific form in which such claims issue, including any subsequent correction.

What is claimed is:

1. A computer-implemented method comprising:
obtaining, for a target website, one or more strike distance keywords and one or more sets of parameters, each set of parameters associated with each of the one or more strike distance keywords, and each set of parameters including a keyword search volume associated with each of the one or more strike distance keywords, a cost-per-click metric associated with each of the one or more strike distance keywords, and a previous organic traffic metric associated with each of the one or more strike distance keywords;
training a machine-learning model using the keyword search volume associated with each of the one or more strike distance keywords, the cost-per-click metric associated with each of the one or more strike distance keywords, and the previous organic traffic metric associated with each of the one or more strike distance keywords, the training generating a trained machine-learning model;
for each strike distance keyword of the one or more strike distance keywords:
generating a semantic embedding vector using a semantic embedding model, using information associated with the one or more strike distance keywords;
generating an appended semantic embedding vector by appending to the generated semantic embedding vector one or more parameters from a set of parameters associated with the strike distance keyword, the one or more parameters including a keyword difficulty or the keyword search volume associated with the strike distance keyword;
providing the appended semantic embedding vector to the trained machine-learning model, wherein the trained machine-learning model has been trained to determine, for a selected website, a traffic increase indicator associated with a selected strike distance keyword which causes a potential increase in web traffic associated with an increase in search engine ranking for the selected website when the selected strike distance keyword is used as a query for the search engine;

determining, based on processing of the provided appended semantic embedding vector by the trained machine-learning model, a corresponding traffic increase indicator associated with the strike distance keyword;

comparing the traffic increase indicator for each strike distance keyword of the one or more strike distance keywords to a variable threshold that is configured to dynamically change based on fluctuations in web traffic associated with the target website;

based on the comparing, identifying a target strike distance keyword for the target website; and autonomously updating one or more webpages of the target website to reference the target strike distance keyword.

2. The method of claim 1, wherein the identifying of the target strike distance keyword for the target website comprises selecting the target strike distance keyword having a highest corresponding traffic increase indicator.

3. The method of claim 1, wherein the one or more traffic increase indicators include likelihood values of an increase in the web traffic.

4. The method of claim 1, wherein the one or more traffic increase indicators include an amount of a traffic increase.

5. The method of claim 1, wherein the parameters further include at least one of: ranking of the website at a previous first time instance, traffic to the website at the previous first time instance, or a cost-per-click metric.

6. The method of claim 1, wherein the parameters further include a ranking of the website at a first time instance, a ranking of the website at a second time instance, web traffic to the website at the first time instance, and web traffic to the website at the second time instance.

7. The method of claim 1, wherein the target strike distance keyword includes a phrase containing a plurality of words.

8. The method of claim 1, wherein the machine-learning model is a random forest model.

9. The method of claim 1, wherein the machine-learning model is trained by building a random forest, and wherein data for building the random forest includes:
the semantic embedding vector;
the keyword difficulty;
a ranking of the website at a first time instance;
a ranking of the website at a second time instance;
web traffic to the website at the first time instance; and
web traffic to the website at the second time instance.

10. The method of claim 1, further comprising:
creating internal links to webpages of the website which reference the target strike distance keyword.

11. The method of claim 1, further comprising:
identifying a first strike distance keyword from the one or more of strike distance keywords, the first strike distance keyword having a greatest increase of the web traffic when the website ranking for that first strike distance keyword is increased; and
identifying a second strike distance keyword from the one or more of strike distance keywords, the second strike distance keyword having a second greatest increase of the web traffic when the website ranking for that second strike distance keyword is increased.

12. The method of claim 11, further comprising:
creating internal links within webpages of the website, based on the first and second identified strike distance keywords.

13. One or more computer-readable non-transitory storage media embodying software that is operable when executed to:

obtain, for a target website, one or more strike distance keywords and one or more sets of parameters, each set of parameters associated with each of the one or more strike distance keywords, and each set of parameters including a keyword search volume associated with each of the one or more strike distance keywords, a cost-per-click metric associated with each of the one or more strike distance keywords, and a previous organic traffic metric associated with each of the one or more strike distance keywords;

train a machine-learning model using the keyword search volume associated with each of the one or more strike distance keywords, the cost-per-click metric associated with each of the one or more strike distance keywords, and the previous organic traffic metric associated with each of the one or more strike distance keywords, the training generating a trained machine-learning model;

for each strike distance keyword of the one or more strike distance keywords:
generate a semantic embedding vector using a semantic embedding model, using information associated with the one or more strike distance keywords;

generate an appended semantic embedding vector by appending to the generated semantic embedding vector one or more parameters from a set of parameters associated with the strike distance keyword, the one or more parameters including a keyword difficulty or the keyword search volume associated with the strike distance keyword;

provide the appended semantic embedding vector to the trained machine-learning model, wherein the trained machine-learning model has been trained to determine, for a selected website, a traffic increase indicator associated with a selected strike distance keyword which causes a potential increase in web traffic associated with an increase in search engine ranking for the selected website when the selected strike distance keyword is used as a query for the search engine;

determine, based on processing of the provided appended semantic embedding vector by the trained machine-learning model, a corresponding traffic increase indicator associated with the strike distance keyword;

compare the traffic increase indicator for each strike distance keyword of the one or more strike distance keywords to a variable threshold that is configured to dynamically change based on fluctuations in web traffic associated with the target website;

based on the comparing, identify a target strike distance keyword for the target website; and autonomously update one or more webpages of the target website to reference the target strike distance keyword.

14. The media of claim 13, wherein the one or more traffic increase indicators include likelihood values of the web traffic increase.

15. The media of claim 13, wherein the software is further operable when executed to:
create internal links to webpages of the website which reference the identified strike distance keyword.

16. The media of claim 13, wherein the machine-learning model is trained by building a random forest, and wherein data for building the random forest includes:
- the semantic embedding vector;
- the keyword difficulty;
- a ranking of the website at a first time instance;
- a ranking of the website at a second time instance;
- web traffic to the website at the first time instance; and
- web traffic to the website at the second time instance.

17. A system comprising:
- one or more processors; and
- one or more computer-readable non-transitory storage media coupled to the one or more of processors and comprising instructions operable when executed by the one or more of processors to cause the system to:
  - obtain, for a target website, one or more strike distance keywords and one or more sets of parameters, each set of parameters associated with each of the one or more strike distance keywords, and each set of parameters including a keyword search volume associated with each of the one or more strike distance keywords, a cost-per-click metric associated with each of the one or more strike distance keywords, and a previous organic traffic metric associated with each of the one or more strike distance keywords;
  - train a machine-learning model using the keyword search volume associated with each of the one or more strike distance keywords, the cost-per-click metric associated with each of the one or more strike distance keywords, and the previous organic traffic metric associated with each of the one or more strike distance keywords, the training generating a trained machine-learning model;
  - for each strike distance keyword of the one or more strike distance keywords:
    - generate a semantic embedding vector using a semantic embedding model, using information associated with the one or more strike distance keywords;
    - generate an appended semantic embedding vector by appending to the generated semantic embedding vector one or more parameters from a set of parameters associated with the strike distance keyword, the one or more parameters including a keyword difficulty or the keyword search volume associated with the strike distance keyword;
    - provide the appended semantic embedding vector to the trained machine-learning model, wherein the trained machine-learning model has been trained to determine, for a selected website, a traffic increase indicator associated with a selected strike distance keyword which causes a potential increase in web traffic associated with an increase in search engine ranking for the selected website when the selected strike distance keyword is used as a query for the search engine;
  - determine, based on processing of the provided appended semantic embedding vector by the trained machine-learning model, a corresponding traffic increase indicator associated with the strike distance keyword;
  - compare the traffic increase indicator for each strike distance keyword of the one or more strike distance keywords to a variable threshold that is configured to dynamically change based on fluctuations in web traffic associated with the target website;
  - based on the comparing, identify a target strike distance keyword for the target website; and
  - autonomously update one or more webpages of the target website to reference the target strike distance keyword.

18. The system of claim 17, wherein the one or more traffic increase indicators include likelihood values of a traffic increase.

19. The system of claim 17, wherein the one or more processors are further operable when executing the instructions to cause the system to:
- create internal links to webpages of the website which reference the target strike distance keyword.

20. The system of claim 17, wherein the machine-learning model is trained by building a random forest, and wherein data for building the random forest includes:
- the semantic embedding vector;
- the keyword difficulty;
- a ranking of the website at a first time instance;
- a ranking of the website at a second time instance;
- web traffic to the website at the first time instance; and
- web traffic to the website at the second time instance.

* * * * *